(12) United States Patent
Galstian et al.

(10) Patent No.: US 6,928,199 B2
(45) Date of Patent: Aug. 9, 2005

(54) TUNABLE OPTICAL DEVICE FOR DYNAMIC CHROMATIC DISPERSION AND POLARIZATION MODE DISPERSION COMPENSATION

(75) Inventors: Tigran Galstian, Quebec (CA); Armen Zohrabyan, Quebec (CA); Dany Dumont, Quebec (CA); Amir Tork, Cap Rouge (CA); Rouslan Birabassov, Quebec (CA)

(73) Assignee: Photintech Inc., Quebec (CA)

( * ) Notice: Subject to any disclaimer, the term of this patent is extended or adjusted under 35 U.S.C. 154(b) by 0 days.

(21) Appl. No.: 10/760,290

(22) Filed: Jan. 21, 2004

(65) Prior Publication Data

US 2004/0151433 A1 Aug. 5, 2004

Related U.S. Application Data

(63) Continuation of application No. 10/658,462, filed on Sep. 10, 2003, now abandoned.
(60) Provisional application No. 60/409,197, filed on Sep. 10, 2002.

(51) Int. Cl.$^7$ .......................... G02F 1/035; H04B 10/12

(52) U.S. Cl. ....................... 385/10; 385/3; 359/247; 359/254; 359/279; 398/149

(58) Field of Search .......... 385/2, 3, 10; 359/245–248, 359/250, 254, 279; 398/149

(56) References Cited

U.S. PATENT DOCUMENTS

| 6,111,999 | A  | * | 8/2000  | Espindola et al. | 385/37  |
| 6,221,565 | B1 | * | 4/2001  | Jain et al.      | 430/321 |
| 6,246,814 | B1 | * | 6/2001  | Park             | 385/37  |
| 6,498,877 | B1 | * | 12/2002 | Chowdhury et al. | 385/37  |

* cited by examiner

*Primary Examiner*—Akm Enayet Ullah
*Assistant Examiner*—Jerry T. Rahll
(74) *Attorney, Agent, or Firm*—Kent Daniels; Ogilvy Renaults LLP

(57) ABSTRACT

The present invention provides a controllable double cladding guiding structure for tunable phase delay, dynamic chromatic dispersion and polarization mode dispersion compensation. The device includes an etched fiber, an electro-optic material with index of refraction changing with externally applied stimulus (electric, magnetic or thermal effect) and a fiber Bragg grating (uniform, apodized, linearly or non-linearly chirped).

10 Claims, 17 Drawing Sheets

TUNABLE OPTICAL DEVICE FOR DYNAMIC CHROMATIC DISPERSION AND POLARIZATION MODE DISPERSION COMPENSATION

CROSS-REFERENCE TO RELATED APPLICATIONS

This application is a continuation application of U.S. patent application Ser. No. 10/658,462 filed Sep. 10, 2003 now abandoned which is based on U.S. Patent Application Ser. No. 60/409,197 filed Sep. 10, 2002.

MICROFICHE APPENDIX

Not Applicable.

TECHNICAL FIELD

The present invention describes devices for dynamic compensation of chromatic dispersion and polarization mode dispersion providing in particular controllable wavelength and polarization selective operation.

BACKGROUND OF THE INVENTION

Tunable filters and variable time delay (wavelength dependent delay and polarization dependent delay) devices have a range of future applications as reconfigurable adding and dropping channels, dynamic flattening of the gain, polarization mode dispersion compensation and dynamic dispersion compensation on a channel per channel or on a multi channel basis.

Chromatic dispersion (CD) describes the group velocity dependence upon wavelength, i.e. different wavelengths travel at different speed along the fiber. CD is the sum of material dispersion and waveguide dispersion. Material dispersion is due to the fiber material's (doped silica) refractive index dependence upon wavelength and waveguide dispersion is defined by the refractive index profile. Dispersion imposes important limitations on high bit rate transmission in optical fibers by broadening pulses in time domain and by distortion of the pulse shapes. At a bit rate of 40 Gb/s and beyond any slight deviation of the CD from its optimum value causes severe penalties in the system. The dispersion tolerance for high bit rates is extremely small, 30 ps/nm at 40 Gb/s. Therefore, optical communication systems will need dispersion compensators, and this is preferable on a per channel basis. The residual CD (the net amount of non-compensated dispersion at the end of the link), any slow or fast changes in the total CD in the fiber plant and in the optical components due to path changes (dynamic reconfiguration of the network), small variations in optical power, temperature fluctuations, repairs, and any other fluctuations and changes in the fiber link will cause fluctuations in the dispersion and will increase the bit-error rate. Therefore, the dynamic dispersion compensation is a necessity. Furthermore, fine-tuning is necessary for high bit rates because the zero dispersion wavelength of the fibers varies from one section to another.

Presently, for application at the receiver, the chromatic dispersion compensator device can compensate either the residual dispersion around zero dispersion or compensate large positive dispersion of the whole system. Different methods in dispersion compensation technology include virtually imaged phased array, Fabry-Perot resonator, single mode dispersion compensation fiber (DCF), and high-order mode dispersion compensation fiber. The dominant solution today is DCF. But DCF lucks tunability, and has limited granularity in the amount of dispersion compensation. It is also quite bulky, lossy, and expensive and it has smaller field mode diameter which increases the nonlinear effects. Another solution is the fiber Bragg grating (FBG), which addresses the present and future challenges of dense wavelength division multiplexing (DWDM) systems. FBG's have shown a lot of promise as a potential technology for tunable single channel dispersion compensation and polarization mode dispersion devices. They also have attractive characteristics as low cost, simple design, low power consumption, small size, and good performance.

When chromatic dispersion is compensated then the polarization mode dispersion (PMD) becomes one of the major obstacles for long distance transmission at high bit rates. Polarization mode dispersion is a physical phenomenon in optical fiber that causes light pulses to spread in time. This may produce inter-symbol interference (two pulses overlap on one another and it will be impossible to distinguish adjacent bits from each other) that will lead to an increased bit error rate (BER) at the receiver. PMD is due to the birefringence of fibers, which arises from the broken circular symmetry of the fiber by the presence of an elliptic core and from noncircular stresses. To first order, PMD may be represented as a time delay or differential group delay between two principal states of polarization (fast axis and slow axis) of the optical fiber. PMD is a statistical process as a result of the randomness of the birefringence variations along the fiber. The statistical nature of PMD makes particularly difficult its control.

System PMD must be 10% of the bit period, which corresponds to 2.5 ps for 40 Gb/s transmission rates. Modern fibers have PMD values about 0.1 ps/$\sqrt{km}$ while legacy fibers have PMD values 0.2–10 ps/$\sqrt{km}$ resulting in PMD more than 100 ps for the transmission distance 500 km which will lead to complete eye closure even at 10 Gb/s transmission bit rate. We must also take into account the PMD of numerous optical components in the optical communication system. The main problem of PMD compensation is that PMD drifts in time and with wavelength and therefore dynamic PMD compensators are needed.

PMD compensator is composed of a polarization controller, a differential group delay (DGD) device and a monitoring feedback loop. The feedback loop is necessary to adjust the state of polarization of the incoming signal to optimally align the DGD element. When first order PMD is compensated the higher order PMD effects must be then compensated.

PMD can be compensated at the receiver (pre-compensation) or at the transmitter (post-compensation). Two approaches can be used to minimize PMD. First approach is to launch the signal into a principal state of polarization (PSP). The second approach is to add a birefringent element before the receiver to compensate the PMD. The first approach is slow because of the transmission of the feedback signal from the receiver to the transmitter. For example for a 500 km link it takes 2.5 ms for a feedback signal from transmitter to receiver. Therefore the performance of the PMD compensator at the transmitter is limited.

PMD compensators were demonstrated using a variable DGD such as a free space polarization delay line. The free space polarization delay line is achieved by bringing light out of fiber, physically separating two orthogonal polarizations with a polarization beam splitter and recombining them with a polarization beam combiner. Such an out-of fiber device has high losses, large output polarization fluctuation, large footprint, poor control certainty due to mechanical motion, and it has low speed. Another technology is to use as DGD a birefringent in-fiber element such as a highly birefrengent nonlinearly chirped fiber Bragg grating. This technology has a potential promise as a birefringent element for PMD compensation. Several schemes for obtaining tunable chirp in fiber gratings written in polarization maintaining fiber were proposed: either by uniform tuning of a nonlinearly chirped fiber Bragg grating or by application of a nonuniform external gradient, such as a temperature or strain gradient. See U.S. Pat. No. 5,982,963 (Feng et. Al). These mechanisms of FBG tuning are highly temperature sensitive and power consuming both of which are undesirable, particularly in compact integrated geometries.

Accordingly, we propose an efficient in-fiber optical device based on FBG (uniform or apodized or linearly chirped or non-linearly chirped) for dynamic chromatic dispersion and polarization mode dispersion compensation (PMDC).

SUMMARY OF THE INVENTION

The techniques and devices of this application include optical devices that can produce phase delay, variable time delay between two principal states of polarization and a mechanism to dynamically adjust the dispersion of FBG that is initially uniform or apodized or linearly or nonlinearly chirped. The present invention comprises an etched fiber containing a FBG, which is surrounded by an electro-optic material applied in the proximity of the grating. The electro-optic material is a composite polymer liquid crystal (CPLC) that has a low ordinary refractive index $n_0$. The dynamically tuning device is realized by controlling the refractive index of the CPLC material. The refractive index of the CPLC can be changed applying the external stimulus (electrical, magnetic or thermal). The variation in the properties of the grating (chirp) may be determined by the original chirp or by applying a stimulus gradient to the CPLC material. The chirp and center wavelength can be controlled independently by the magnitude of the applied voltage and its gradient using multi-electrode geometry.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
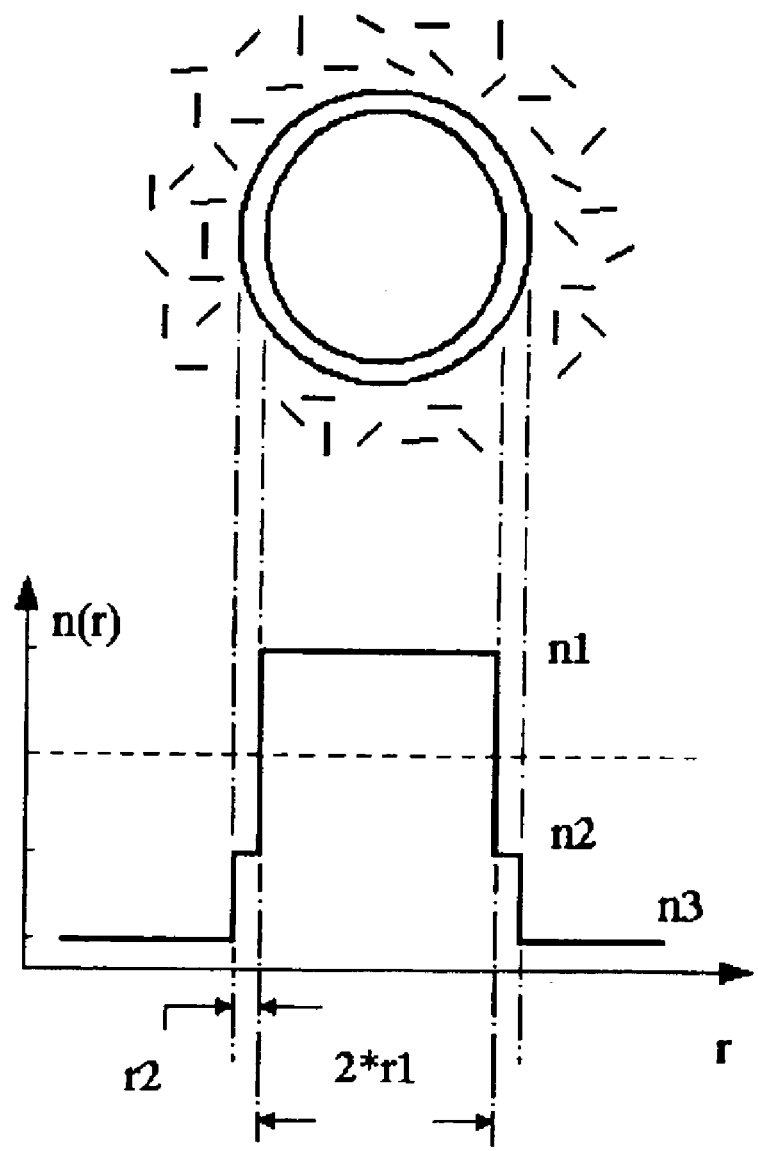
FIG. 1 is a schematic illustration of operation conditions of an embodiment of the present invention implemented as a variable phase delay and tunable filter.

Further discussion will use the example of circular waveguides (fibers) while planar waveguides can also be used. An optical fiber is a small diameter waveguide which has an axi-symmetrical core and a cladding. One aspect of the techniques of this disclosure is to use a double cladding structure when a FBG (uniform or apodized or linearly or nonlinearly chirped) is formed in the core of the fiber to obtain a dynamically adjustable chromatic dispersion and dynamically adjustable time delay between two orthogonal polarization components. Other kind of gratings may be also used.

In this disclosure the evanescent field approach was used. It is well known that the cladding contributes largely to the power propagation in the fiber. Thus the guidance in the fiber is affected by the refractive index of the surrounding medium if it is placed in the vicinity of the fiber core so that the evanescent field of the guided light can "see" the external index of refraction $n_3$ (See FIG. 1). Therefore any changes in the refractive index of the external material will affect the effective index of refraction and the propagation properties of the guided light.

Our approach is based on placing a birefringent electro-optic material, composite polymer liquid crystal (CPLC), in the vicinity of the evanescent field of the guided mode that allow the electro-optic modifications of the refractive index of surrounding medium $n_3$ change the effective index of refraction of the core $n_{eff}$. This structure is composed of the core (with the refractive index $n_1$), ultra thin cladding (with the refractive index $n_2$) and surrounding medium (with the refractive index $n_3$) and it can be considered as a three-layer structure (doubly clad fiber) in which third layer structure has a dynamically controllable refractive index $n_3$ (see FIG. 1). Further we will call it the external index of refraction.

To approach to the evanescent field of the core mode the thickness of the cladding was reduced by chemical etching using hydrofluoric (HF) acid solution. The thickness of the cladding was controlled by the concentration of solution and by the etching time. The etched fiber is inserted between two glass plates separated by a gap of 15–30 µm. The inner surfaces of glass plates are deposited with transparent electrodes (indium tin oxide). The system is treated to ensure that the liquid crystal molecules are initially oriented parallel to the direction of fiber axis. The space between glasses is filled with a CPLC material (see FIG. 2). Because of orientational ordering of rodlike molecules, nematic liquid crystal is uniaxially symmetric (with two principal refractive indices $n_o$ and $n_e$) with the axis of symmetry parallel to average orientation of the axes of molecules (director). The ordinary refractive index $n_o$ corresponds to light with electric field polarization perpendicular to the director and extraordinary refractive index $n_e$ for the light with electrical field polarization parallel to the director. Applying external voltages one can control the ordering and the orientation of liquid crystal molecules and therefore their refractive index. The birefringence of composite liquid crystal materials can reach rather high values $\Delta n = n_e - n_0 \approx 0.2$. To ensure that the core mode is guided, the refractive index of the electro-optic material must be always less than the effective refractive index of the core mode $n_{eff}$. For practical applications the refractive index of CPLC should always stay lower than the refractive index of the cladding material. There are several different molecular orientation configurations that can be applied to this device (see, for example, Applicant's co-pending U.S. patent application Ser. No. 10/237,622). We will consider one of these geometries as an example. In the initial state the CPLC molecules are aligned parallel to the fiber and to the surfaces of the electrode plates. When a voltage is applied to the electrodes the CPLC molecules are forced to align parallel to the electric field.

Figure 2:
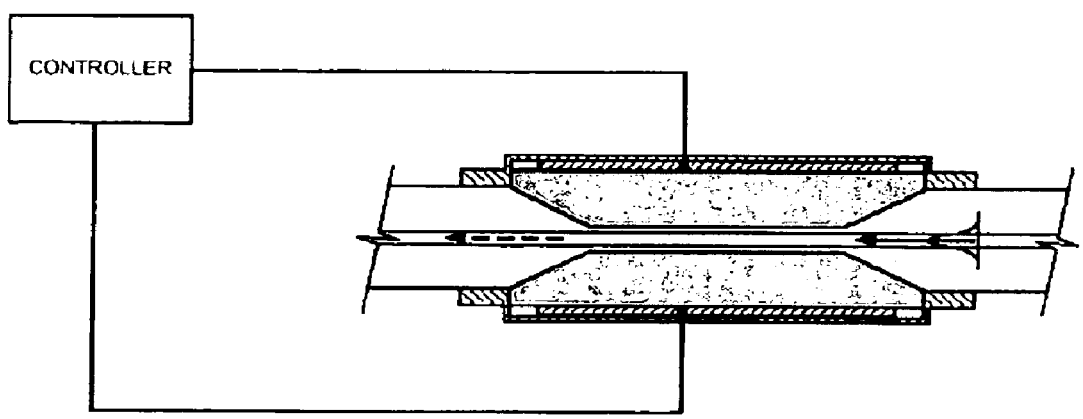
FIG. 2 is a schematic external illustration of an optical device to obtain a variable phase delay.
Figure 4:
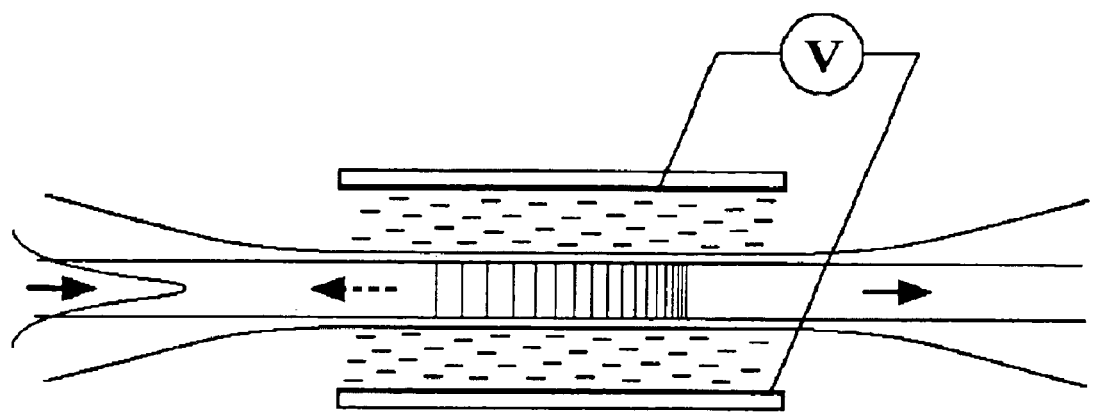
FIG. 4 schematically illustrates the operation of an embodiment of the present invention implemented as a variable wavelength selective and polarization selective delay.
Figure 5A:
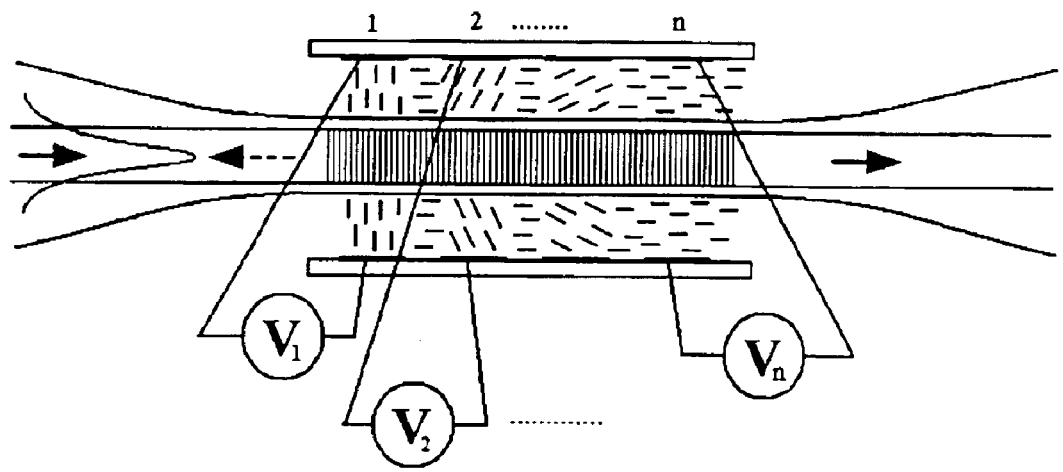
FIGS. 5a & 5b schematically illustrate possible variations of the embodiment of FIG. 4 using multiple electrodes.
Figure 5B:
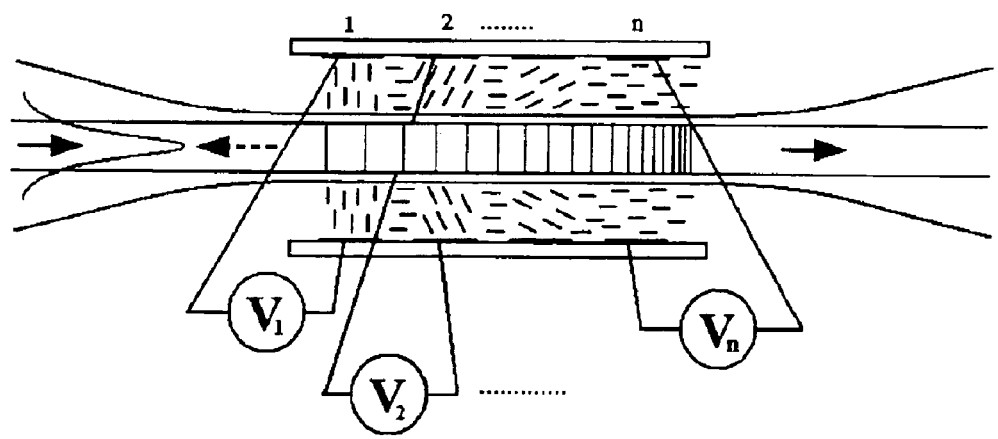

The devices schematically shown in FIGS. 2, 4&5 with unmodified core relies either on single pair of electrodes or on multiple electrode geometry. A composite polymer liquid crystal material is disposed around the cladding within the control region and is capable of interaction with the evanescent field of the core mode. A controller is arranged to externally apply the stimulus to the CPLC material.

Figure 3:
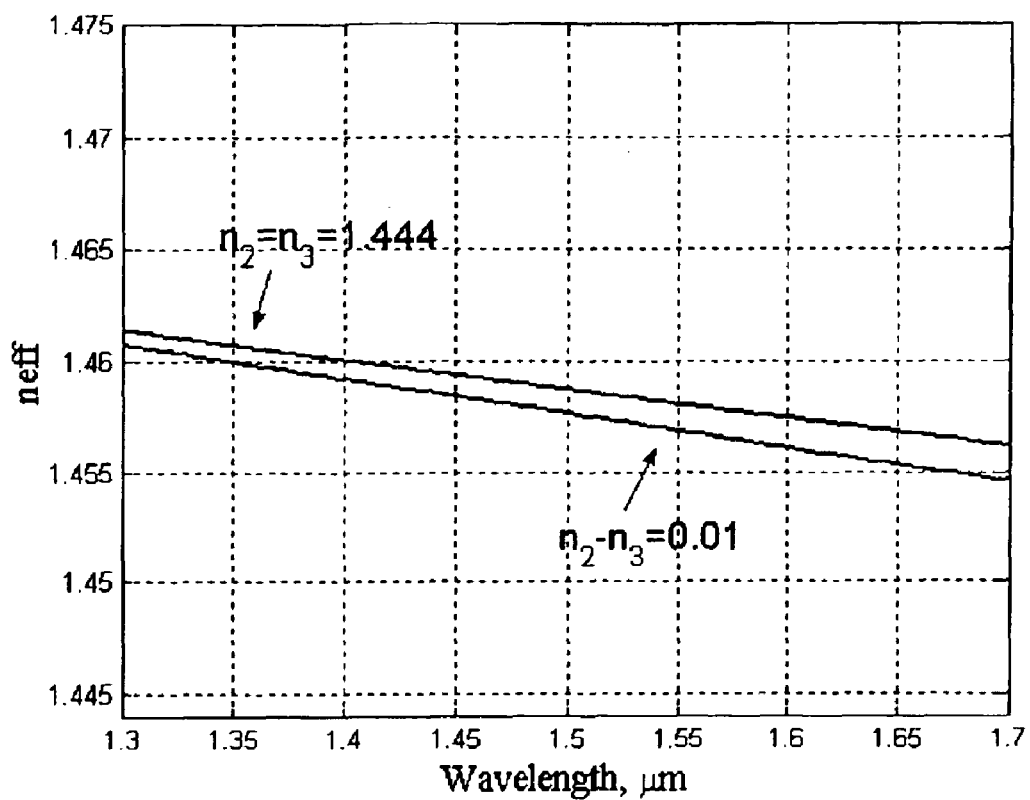
FIG. 3 is a chart showing the calculated change of the dispersion (refractive index dependence of the core mode upon wavelength) due to the applied voltage in the system of FIG. 2.

FIG. 3 shows the effective index change with wavelength (dispersion) for two values of the external index of refraction. The first curve of FIG. 3 was obtained for n2=n3=1.444, r2=r1=1.75 µm and the second curve for n2=1.444, n3=1.434, r2=r1*1.2 and r1=1.75 µm (see FIG. 1). The length of the controllable region can vary from several mm to several centimeters during fabrication. For example for the wavelength $\lambda=1.5$ µm we obtain a change in the effective index of refraction $\Delta n_{eff} = 1.1 \times 10^{-3}$. This value will lead to a large phase delay (up to several $\pi$) between two orthogonal polarizations for the system shown in FIG. 2. It can be used as a polarization controller for polarization mode dispersion compensation. Another aspect of this index change is the wavelength shift of about 1 nm for a typical uniform or chirped fiber Bragg grating operating in telecom wavelength range (see FIG. 4).

FIG. 4 illustrates a block diagram showing the structure of a dynamic dispersion compensation device. First a fiber Bragg grating was formed in the core of the fiber. The grating is formed only in the core if only the core is doped, otherwise, it could be formed also in the cladding.

The chirped fiber Bragg gratings can be realized either by varying the period of the grating along the grating or the effective index of refraction of the core mode. Bragg phase matching condition is given by:

$$\lambda_B(z) = 2n_{eff}(z) \cdot \Lambda(z) \tag{1}$$

where $n_{eff}$ and $\Lambda$ are the effective refractive index of the core and the period of the grating, respectively. They may be changed uniformly, linearly or nonlinearly along the length of a grating.

For chirped gratings the Bragg wavelength varies along the length of the grating. Therefore the different wavelength components of the signal are reflected from different locations or at different times along the Bragg grating. The shorter wavelengths are reflected at the near end of grating and the longer wavelengths at the far end or vice versa (depending on the sign of the chirp). Thus the longer wavelength is experiencing an additional time delay with respect to shorter wavelengths or vice versa. Therefore chirped FBG's can be used as a dispersion compensation device.

The chirp can be obtained by chirping the effective index of refraction $n_{eff}$, period $\Lambda$ or combination of both of them. For example, U.S. Pat. No. 5,007,705 (Morey et al.) teaches a tunable FBG in which a heating electrode is used to change the geometrical period $\Lambda_{FBG}$ of the grating or the refractive index $$n_{eff}^{core}$$

of the core material.

U.S. Pat. No. 5,982,963 (Feng et al.) teaches that a nonlinearly chirped fiber Bragg grating can be used as a dynamic dispersion compensator by stretching the fiber or by applying an electromagnetic radiation.

In the present disclosure the initially formed FBG may be uniform or chirped (see FIGS. 4 &5). The change in Bragg wavelength along the fiber, which defines the chirp, is determined by externally applied stimulus (uniform voltage along the grating for nonlinearly chirped FBG's or voltage gradient for uniform FBG's). The change in Bragg wavelength is related to the change in the effective refractive index of the core. For example in order to induce a tunable chirp, the voltage must be applied in such a way that the change in the effective index varies linearly or nonlinearly with position along the grating. Here we describe a device capable of producing different chirp profiles in a controlled manner and the possibility of tuning the wavelength resonance of fiber Bragg gratings. Our solution is based on either using initially nonlinearly chirped FBG and then changing uniformly the effective refractive index or using initially non-chirped FBG and then changing nonlinearly the effective index of refraction based on multiple electrode geometry. By choosing appropriate multi electrode geometry and applying voltage gradient we can independently control the chirp and the wavelength shift (see FIG. 5).

Figure 6:
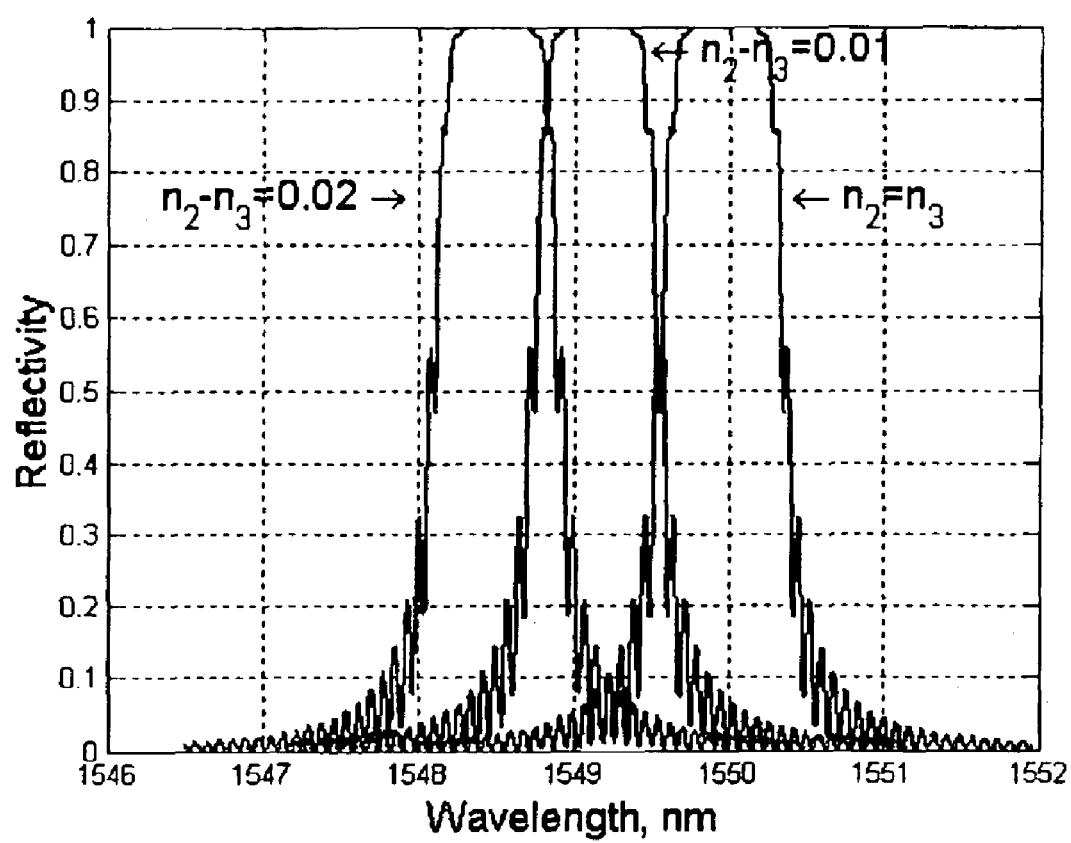
FIG. 6 is a chart showing the calculated shift of the reflection spectrum in the system of FIG. 4.

FIG. 6 shows the calculated shifts of reflection spectrum due to the change in the refraction index of the CPLC for three values of the refractive index of the composite liquid crystal n2=n3=1.444, n2−n3=0.01, and n2−n3=0.02 for linearly chirped FBG Bragg gratings with approximately 1 nm bandwidth and r2=r1*1.2.

Figure 7:
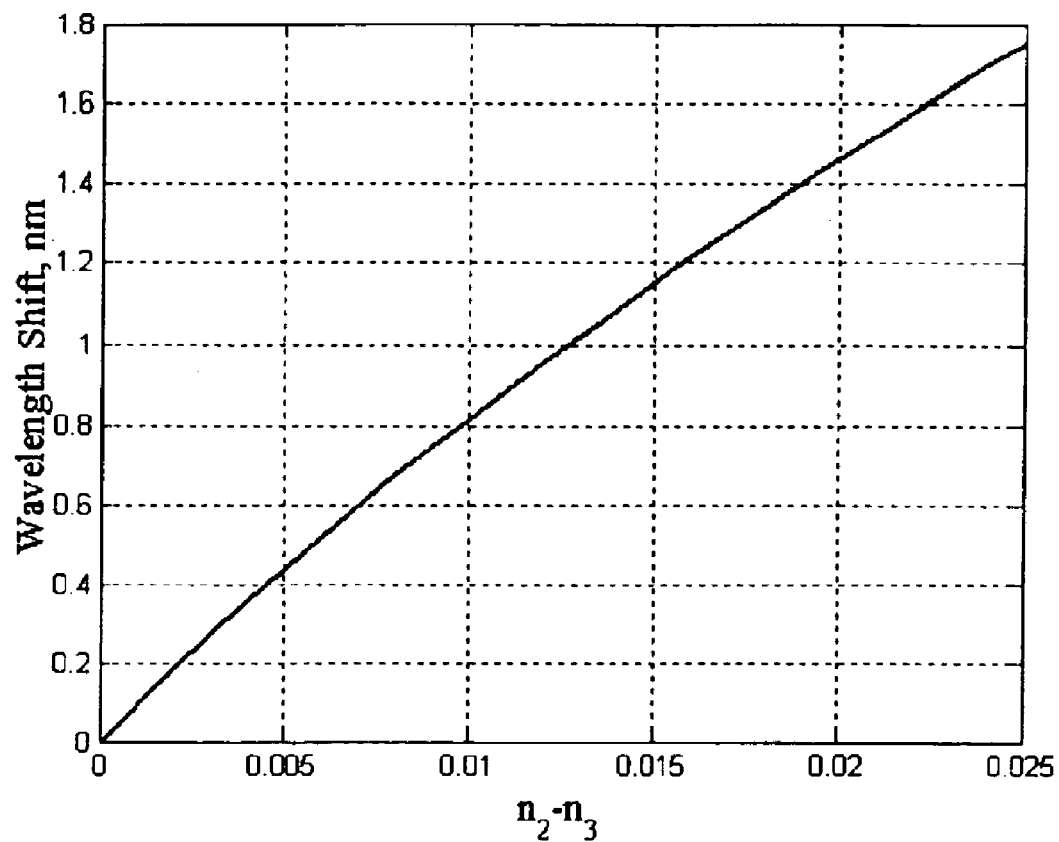
FIG. 7 is a chart showing the calculated wavelength shift of the reflection spectrum due to the applied stimulus in the system of FIG. 4.

FIG. 7 shows the calculated shift of the Bragg wavelength in the reflection spectrum as a function of the external index of refraction. The wavelength shift is not linear but rather smooth with the external index change (proportional to the applied voltage). For external index change $n_2-n_3=0.025$ (which is possible in special fibers), the reflection peak shifts by 1.8 nm. A gradient in the applied voltage along the fiber causes a chirp in the grating. The approximately linear external index gradient (which depends on the applied voltage) induces a similar gradient in the effective index of refraction. This method allows us to obtain the nonlinear chirps of complex form in the effective index of refraction of the core mode. The change in the Bragg wavelength along the fiber, which defines the chirp, is related to the etched diameter (defined during fabrication), applied voltage and the geometry of electrodes. In order to induce a nonlinear chirp we must apply the voltage gradient nonlinearly along the fiber (FIG. 5). For linearly chirped FBG's to tune the dispersion we must tune the chirp. For nonlinearly chirped FBG's we will uniformly tune the effective index of refraction along the grating. Therefore, we will use the technique where the dispersion is tuned by varying the magnitude of the voltage gradient or by changing the chirp rate.

Figure 8:
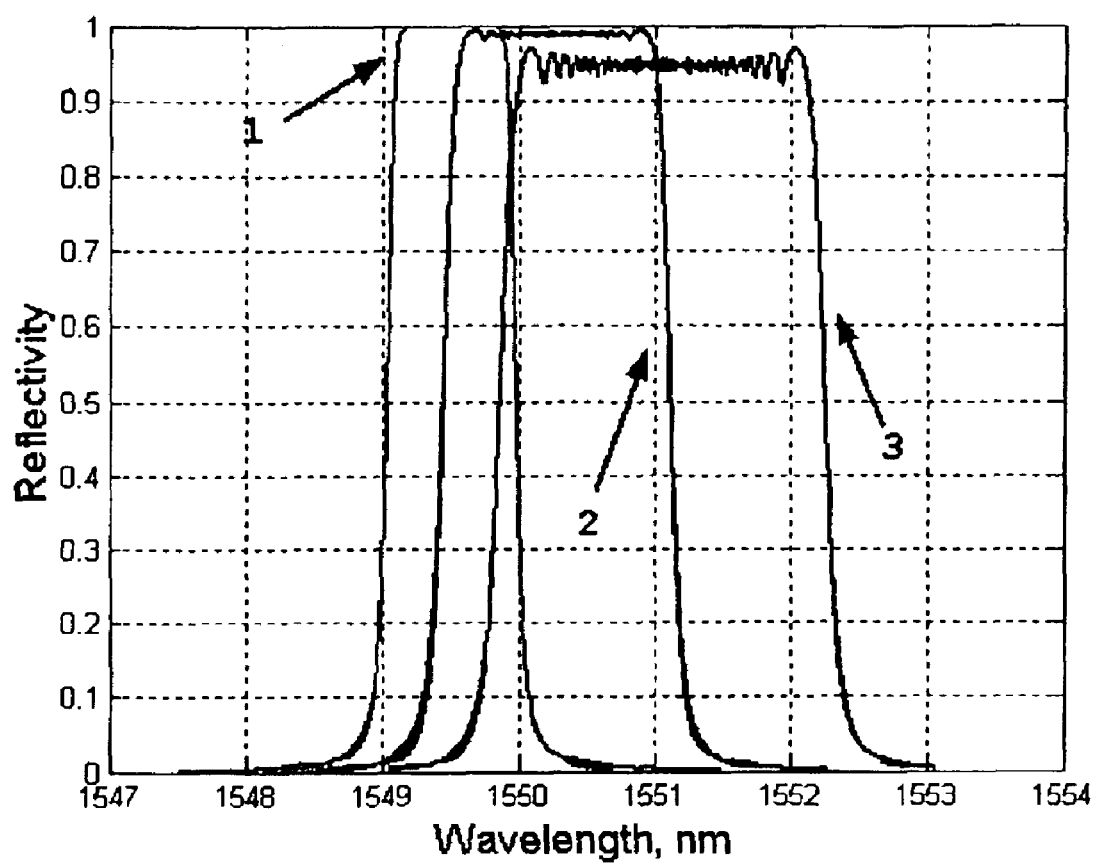
FIG. 8 is a chart showing calculated shift of the reflection spectrum in the system of FIG. 5.
Figure 9:
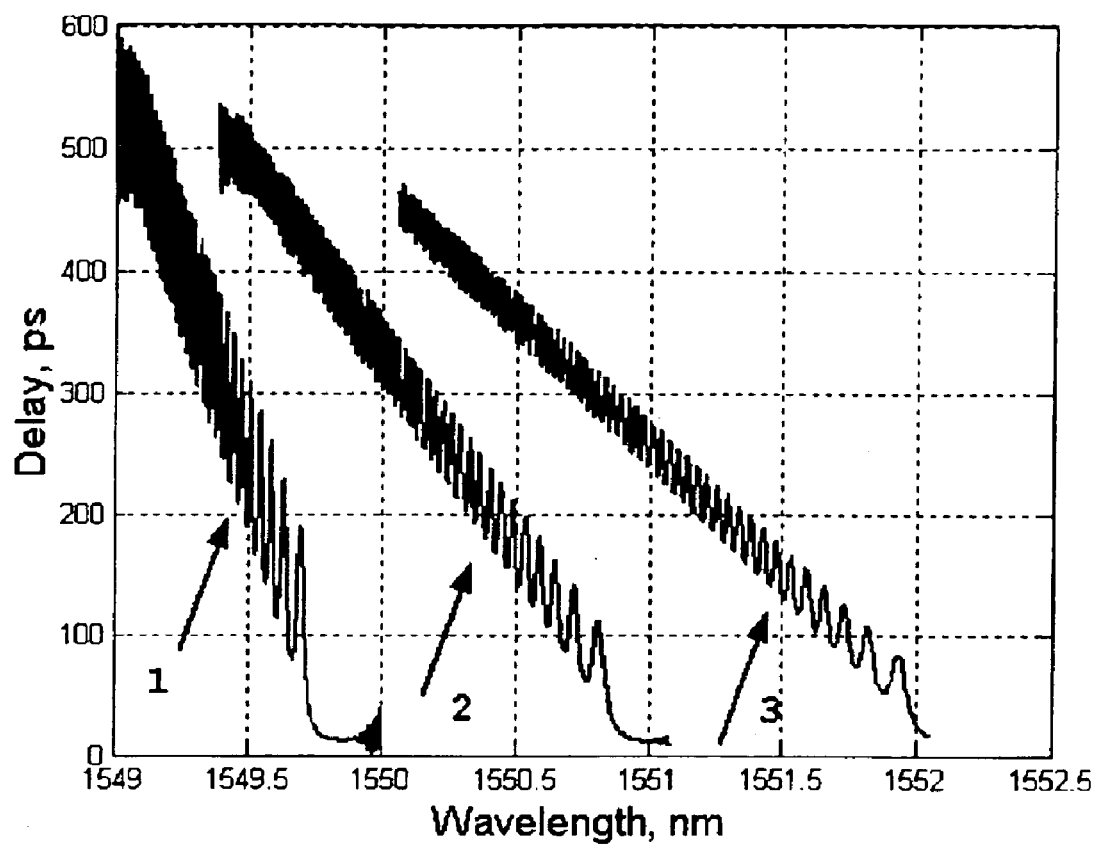
FIG. 9 is a chart showing time delays of reflected signals as a function of wavelengths that are calculated in the fiber gratings of FIG. 5.

FIGS. 8&9 show the ability to tune the dispersion by adjusting externally the chirp $C=-1*10^{-11}$ 1/nm (curve 1), $C=-2*10^{-11}$ 1/nm (curve 2), and $C=-3*10^{-11}$ 1/nm (curve 3). The reflection spectrum is broadening due to a change of the chirp. The reflectivity was maintained above 95% for all values of the chirp. The reflection spectrum of the grating shifts to a longer wavelength, the maximum reflectivity decreases and strong amplitude ripples appear. FIG. 9 shows the respective group delay values. The dispersion values in FIG. 9 are 220 ps/nm (curve 3), 350 ps/nm (curve 2) and 910 ps/nm (curve 1) for chirp $C=-3*10^{-11}$ 1/nm, $C=-2*10^{-11}$ 1/nm, and $C=-1*10^{-11}$ 1/nm, respectively. Time delay is a linear function with wavelength because different wavelengths are reflected at different points of the grating. As we can see by changing the linear chirp we can tune the dispersion. In order to do not shift the reflection band we can tune simultaneously the chirp and peak wavelength.

Figure 10:
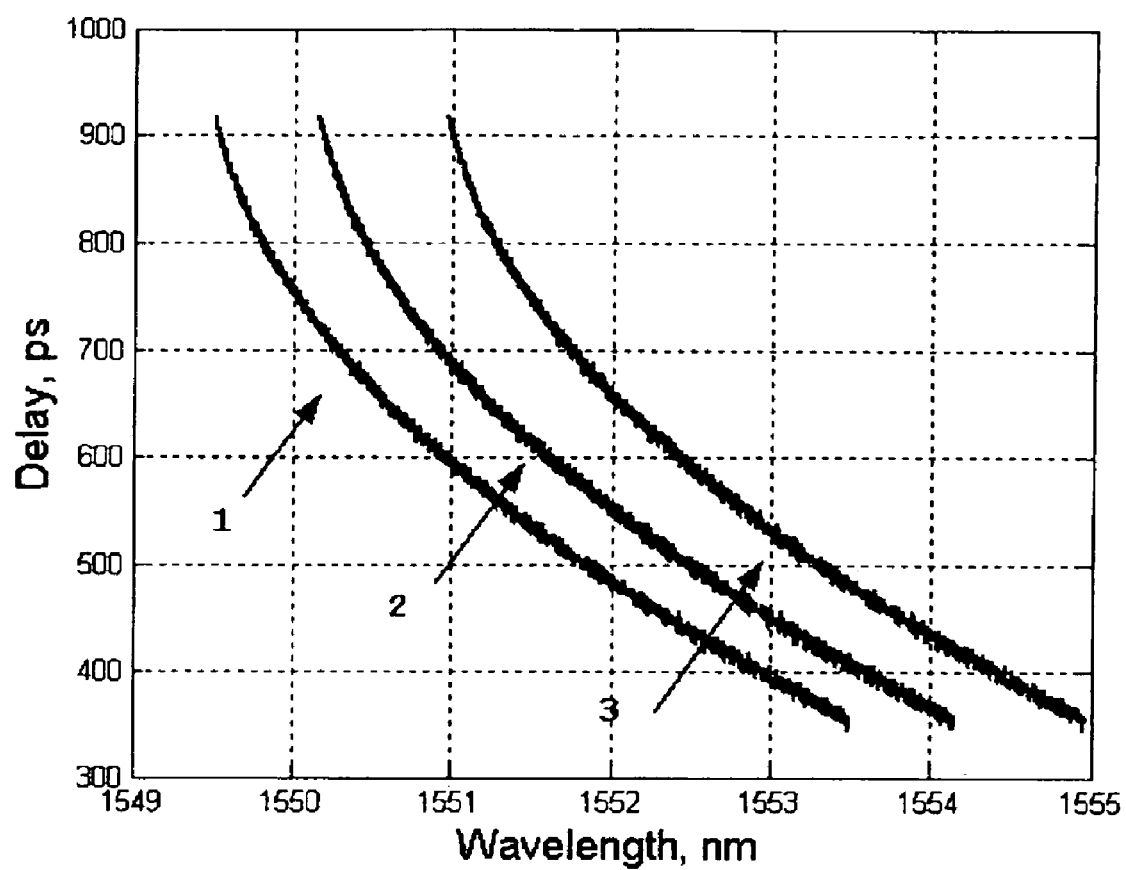
FIG. 10 is a chart showing nonlinear time delays of reflected signals as a function of wavelengths that are calculated in the fiber gratings of FIG. 5.

Another aspect of the present invention is a tuning of the nonlinear fiber Bragg grating. Delay for nonlinearly chirped FBG (quadratic chirped grating) changing quadratically (see FIG. 10). The chirp $C=-1*10^{-11}$ 1/nm (curve 1), $C=-2*10^{-11}$ 1/nm (curve 2), and $C=-3*10^{-11}$ (curve 3). The dispersion can be easily tuned (by more than 1000 ps/nm) only by uniformly changing the effective index of refraction (in given example it changes by more than 400 ps/nm). The reflectivity of quadratic chirped gratings is not uniform along the reflection band. It has the characteristics of a uniform grating at wavelengths where chirp is small and reflectivity decreases at wavelength where chirp has large values.

Figure 11A:
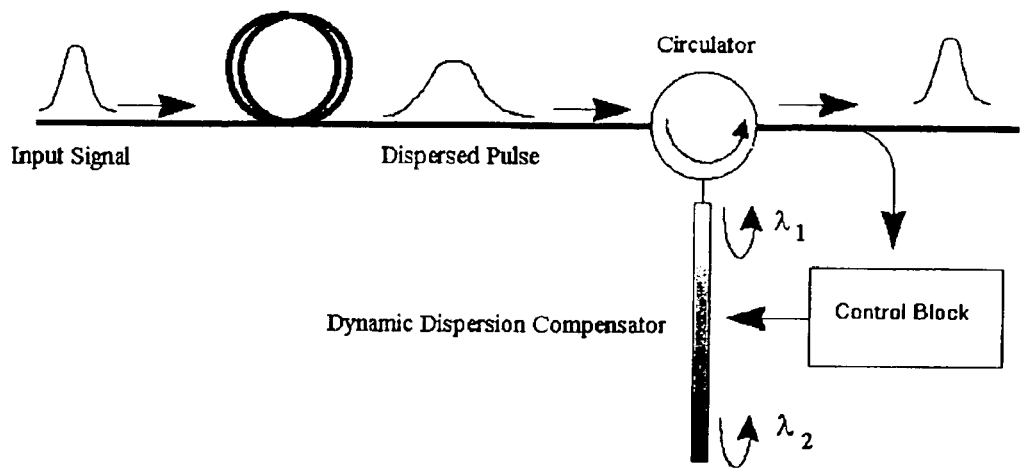
FIGS. 11a & 11b are the diagrams of implementations of the system of FIGS. 4 & 5 for dynamic dispersion compensation.
Figure 11:
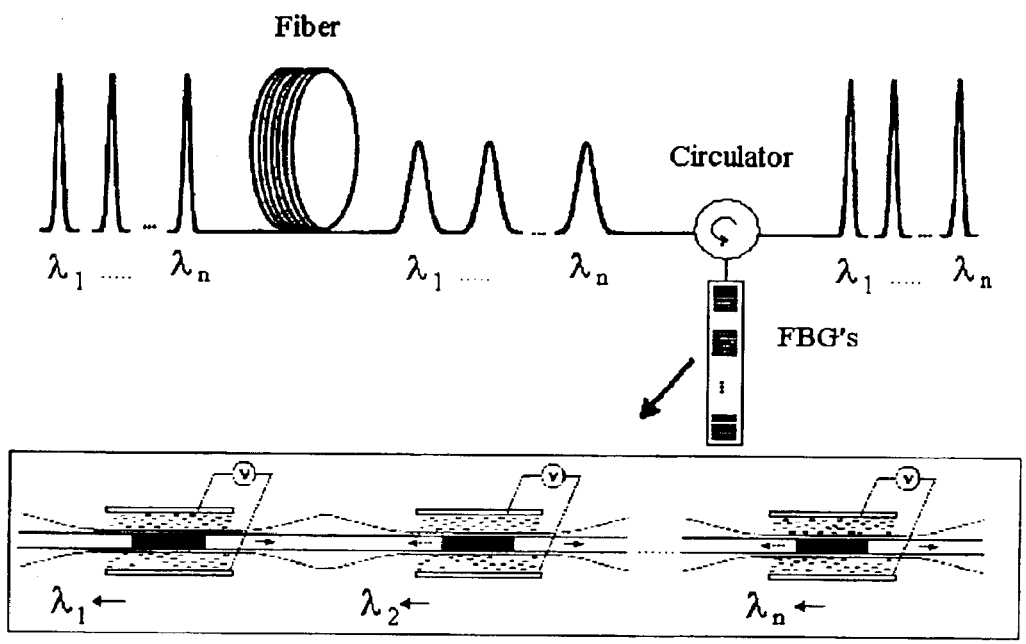

FIG. 11 shows the typical system having a dispersion compensation element. FBG is connected to the fiber link by means of the circulator. From FIG. 11 we see that the pulse is continuously monitored to calculate the dynamic dispersion and the FBG's parameters are updated continuously or dynamically. After the circulator a feedback loop is necessary to tune the grating and thereby to dynamically track changes in dispersion of the fiber. FIG. 11a demonstrates a single channel dynamic dispersion compensator. Multi channel dynamic dispersion compensator is also possible (see FIG. 11b).

Differential group delay (DGD) is the time domain manifestation of polarization mode dispersion (PMD). There is also frequency domain manifestation of PMD due to the optical birefringence dependence upon frequency $\Delta n(\omega)$ or wavelength $\Delta n(\lambda)$. The output polarization from the fiber undergoes a rotation on the Poincare sphere. The three-dimensional rotation vector $\vec{\Omega}$ describes the rate of rotation and is called a dispersion vector. The magnitude of this vector is DGD: $|\vec{\Omega}|=\Delta\tau$. The direction of the vector defines an axis whose two intercepts with the surface of Poincare sphere correspond to the two principal states of polarization (PSP) of the fiber output. If a PSP is excited at the input of the fiber then pulses will propagate undistorted. Therefore the signal will stay completely polarized and the output polarization remains constant to first order as a function of optical frequency. If the signal polarization is a mixture between PSP's then the pulse broadens in the time domain and the signal becomes depolarized in the frequency domain.

Higher order PMD describes the change in the PMD vector both in magnitude and in direction with changes in frequency. Second order PMD is described by the derivative of $\vec{\Omega}(\omega)$ and can be represented mathematically as:

$$\vec{\Omega}_\omega = \frac{d\vec{\Omega}(\omega)}{d\omega} = \Delta\tau_\omega \cdot \vec{q} + \Delta\tau \cdot \vec{q}_\omega \tag{2}$$

The first term, which is parallel to $\vec{\Omega}$, represents the change of DGD with frequency and is frequently called the polarization dependent chromatic dispersion, and the second term, which is orthogonal to $\vec{\Omega}$, represents the rotation of the principal state of polarization and is called the depolarization component.

Figure 12:
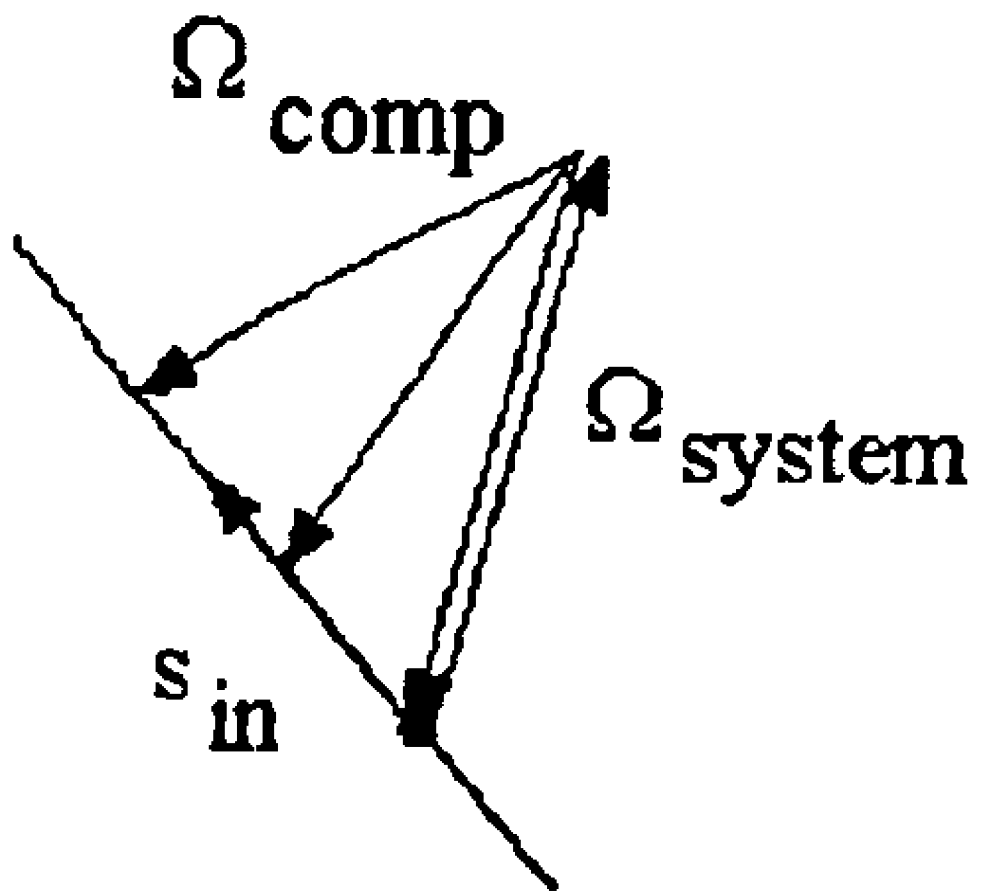
FIG. 12 is a geometrical diagram of one implementation of the system of FIGS. 4 & 5 as a variable delay compensator.

The basic concept of the variable delay compensator is shown in FIG. 12 using the geometrical representation of the PMD vector. The total PMD vector can be cancelled or aligned along the state of polarization.

$$|\vec{\Omega}_{tot}(\omega)|=|\vec{\Omega}(\omega)+\vec{\Omega}_{comp}| \tag{3}$$

where $\vec{\Omega}_{comp}$ is the compensating vector. By applying an opposite $\vec{\Omega}_{comp}$ at the receiver we can compensate first order PMD of the system. The second order PMD is approximately perpendicular to $\vec{\Omega}$ of the system. Therefore aligning the input state of polarization (SOP) of the signal with the derivate $\vec{\Omega}_\omega$ we can compensate the second order PMD.

U.S. Pat. No. 5,473,457 (Ono) teaches that analyzing a received optical signal and separating the received pulse into fast and slow modes one can compensate PMD. Fast mode components are delayed by a polarization maintaining fiber.

Variable DGD compensator provides superior performance in a system with a dynamic tracking control. A technique of using a double stage compensators to compensate also for higher order PMD is disclosed by Yu et al. in "Higher order polarization mode disprsion compensation using a fixed time delay followed by a variable time delay", IEEE Photonics Technology Letters, Vol. 13, No. 8, P. 863–865 (2001). The first stage with a fixed DGD is used to compensate the second order PMD. The second stage is used to compensate the residual first order PMD.

U.S. Pat. No. 6,330,383 (Cai et al.) teaches that a nonlinearly chirped fiber Bragg grating, when formed in an optical birefringent material (polarization maintaining fiber), may be used to produce a dynamically adjustable time delay between orthogonal polarizations. A nonlinearly-chirped fiber Bragg grating written into a high-birefringence fiber can be used as a variable DGD for PMD compensator. The high-birefringence fiber provides a different delay for different SOPs, and the nonlinear chirp provides the ability for tuning of the specific amounts of time delay between two PSP. The differential time delay can be tuned by using thermo-optic, piezoelectric, acousto-optic effects, fiber stressing, compressing or bending mechanisms.

In the present disclosure the variable DGD is obtained using the system of FIG. 1. By selecting and controlling the variable-index birefringent material such that the refractive index of the variable index material always stays less than the effective refractive index $n_{eff}$ of the core modes.

Figure 13:
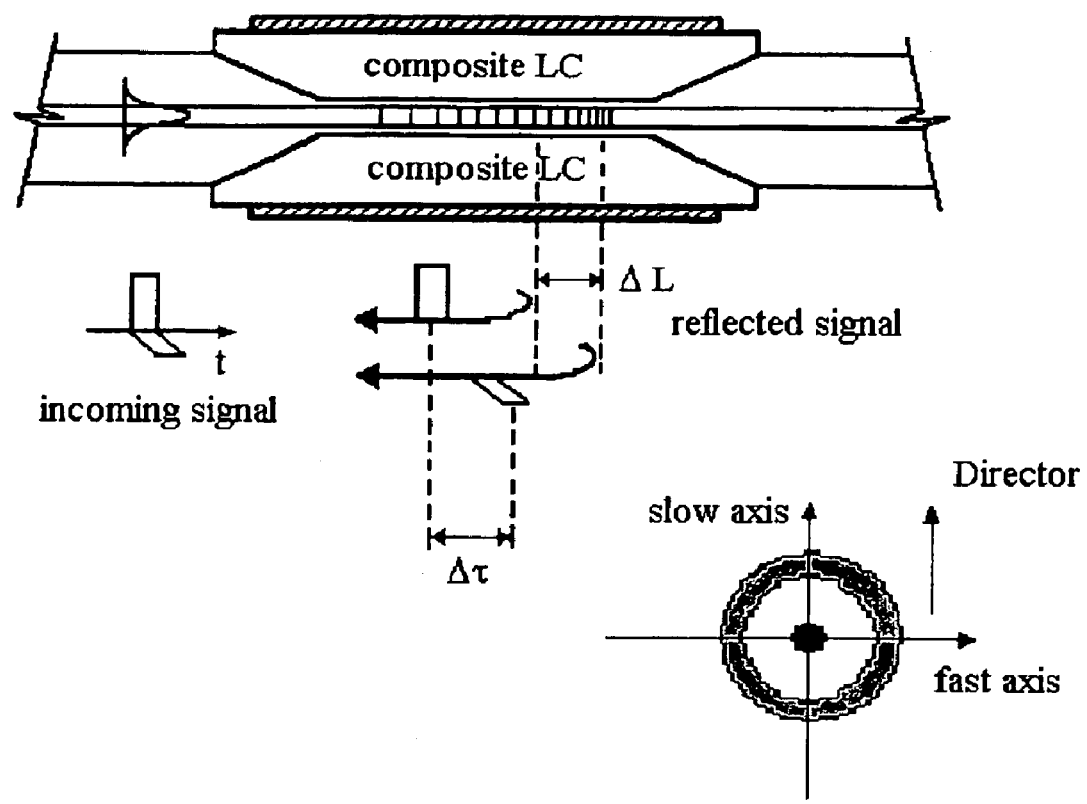
FIG. 13 is a diagram showing a system for polarization mode dispersion compensation using a birefringent CPLC material.
Figure 14A:
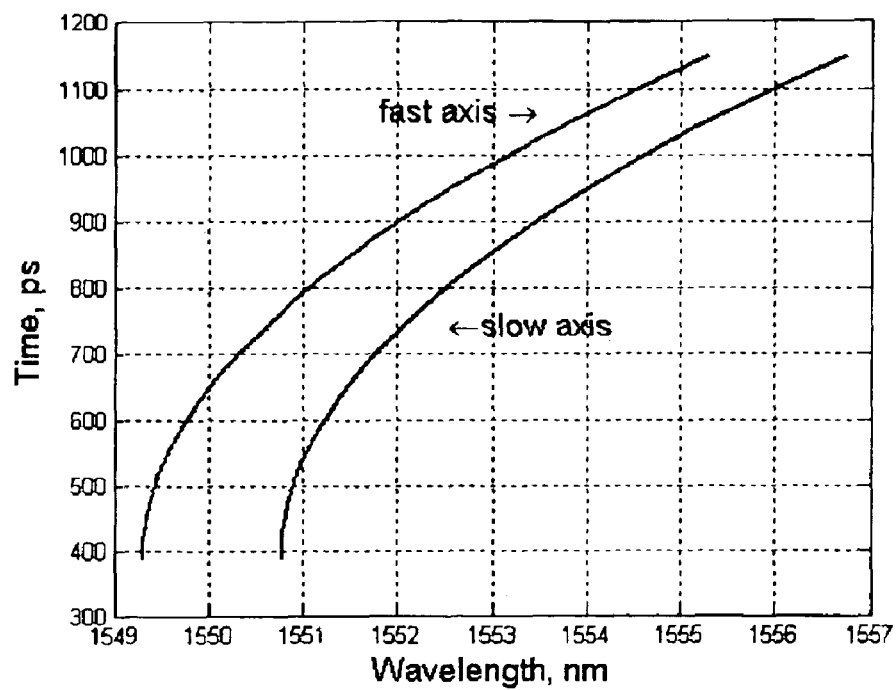
FIGS. 14a & 14b are the charts showing the calculated time delays for two orthogonal states of polarization as a function of wavelength and the respective nonlinear dependence of the differential time delay upon the wavelength for the system of FIG. 4 and FIG. 5.
Figure 14B:
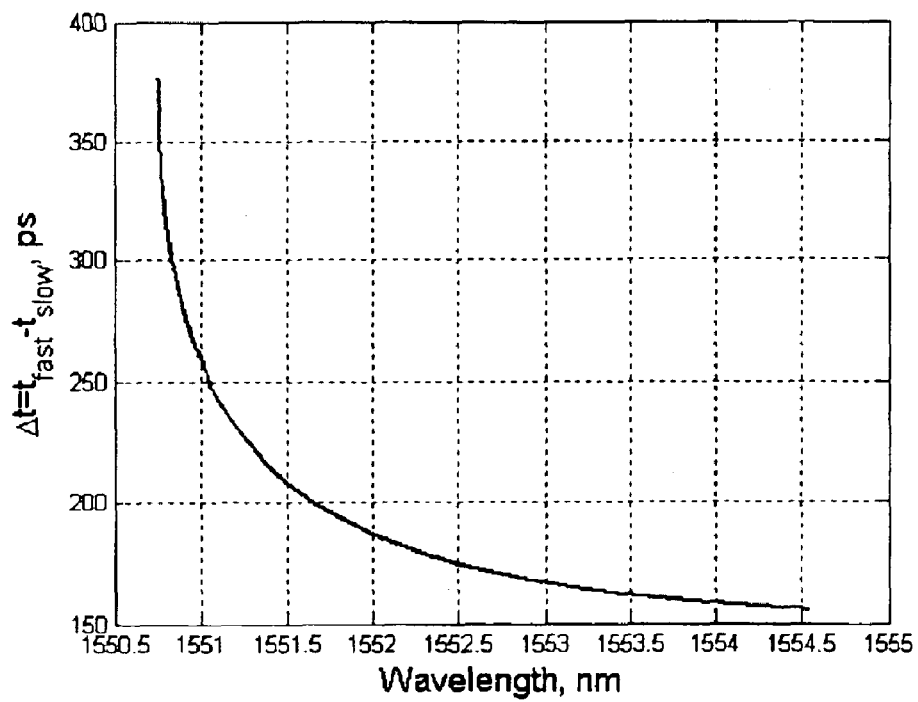

FIG. 13 illustrates a FBG formed in the core and a birefringent CPLC that has high refractive index difference between fast and slow polarization axes. The differential time delay between two PSP is defined by the difference in reflection points. The difference in reflection points $\Delta L$ causes a differential time delay $\Delta \tau$ between two PSP. Initially both orthogonal polarizations will "see" the same external index of refraction $n_0$. As the refractive index of the variable index material increases (staying below $n_{eff}$), light with electric field polarization in the same plane as the director will "see" a higher index of refraction than the light with electric field polarization perpendicular to the director which will "see" the unperturbated effective index of refraction $n_0$. The value of the time delay between two orthogonal polarizations is controlled by the difference between the external index of refraction and the effective index of refraction of the core mode $n_{eff}$. It also depends on the chirp parameter, which we can control by applying the stimulus gradient for the given length of the FBG. FIG. 14a shows the calculated time delay dependence on wavelength for two orthogonal states of polarization (see FIG. 13) for nonlinearly chirped FBG with bandwidth of about 1 nm at 1550 nm and length L=10 cm. The slow axis corresponds when the external index of refraction $n_3=n_2=1.444$, and fast axis corresponds when $n_2-n_3=0.02$. FIG. 14b shows the respective nonlinear dependence of the time delay on the wavelength that changes from about 160 ps to 350 ps within 4 nm bandwidth.

Figure 15A:
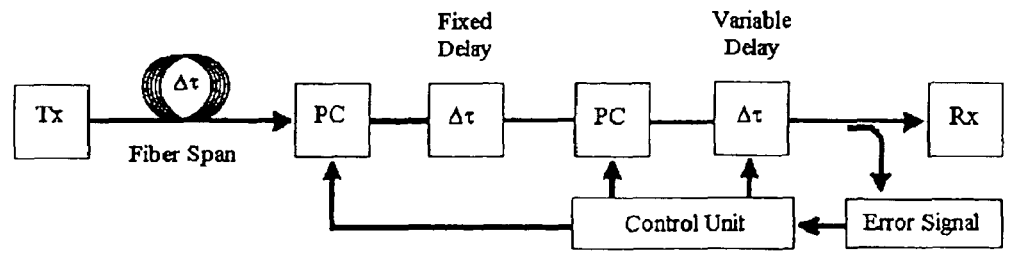
FIGS. 15a & 15b is a diagram of one implementation of the system of FIGS. 2, 4 &5 for polarization mode dispersion compensation.
Figure 15B:
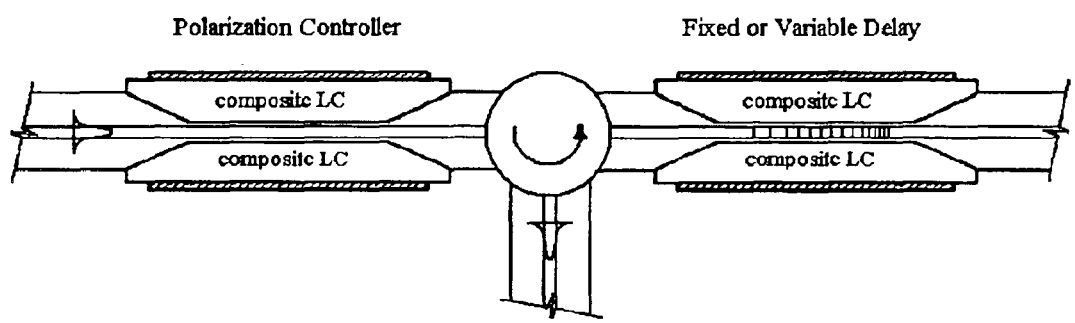

FIG. 15 shows a typical double stage PMD compensation system where a circulator, or other similar methods to combine optical signals without interference because they have orthogonal polarizations. The system shown in FIG. 2 can be used as a polarization controller and the system shown in FIGS. 4&5 can be used as a fixed or differential polarization delay element (see FIG. 15b). Another possibility is to change the system of PC and DGD element by only one system but with multi-electrodes cylindrical geometry in order to dynamically change the birefringence axis or director.

FBG's are in general acting in reflection geometry. A bandpass transmission response is advantageous for many applications, for example as a individual channel selection in DWDM systems. It also avoids the need of circulators, couplers or other similar optical components to separate the reflected signal from the input signal.

Figure 16:
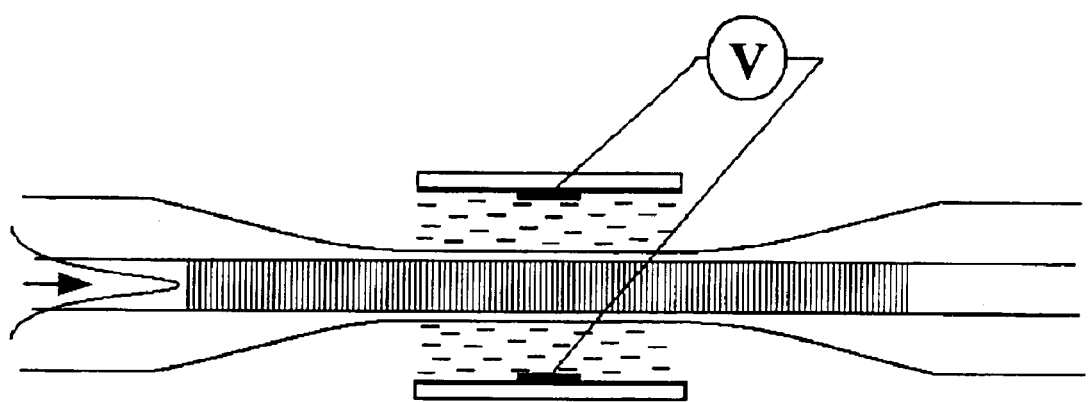
FIG. 16 shows a schematic illustration of an optical device to obtain a tunable narrowband transmission filter.
Figure 17A:
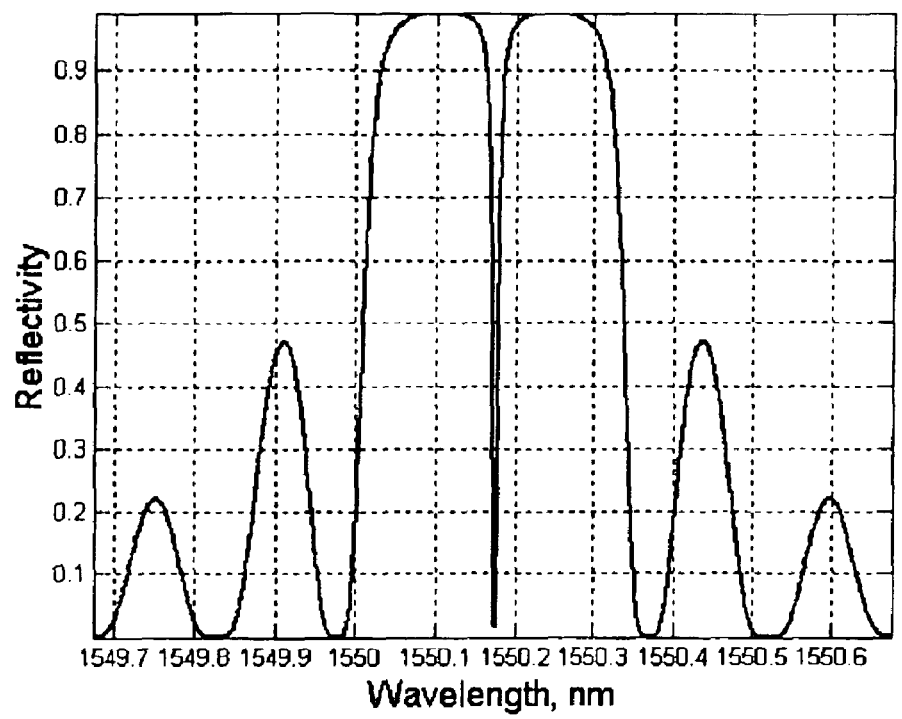
FIGS. 17a & 17b are charts showing the narrowband transmission shift due to the locally applied voltage in the system of FIG. 16.
Figure 17B:
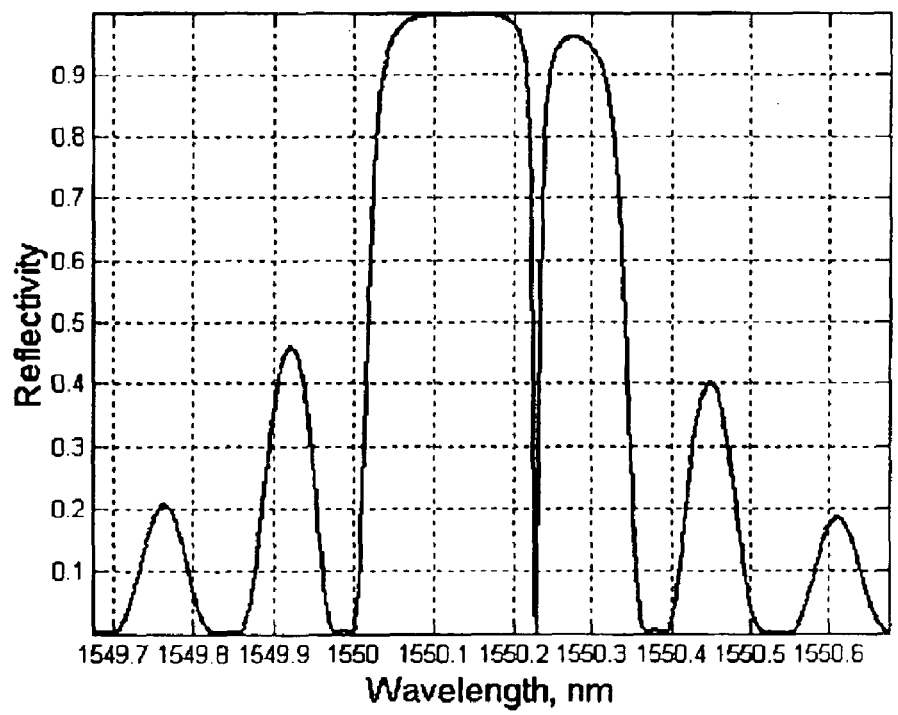

In the present disclosure we present a tunable narrowband FBG filter. To obtain a tunable phase shift we will use the system shown in FIG. 16. Tuning of the transmission resonance peak can be achieved for our technology simply changing the effective index of refraction in the center of the grating (see FIG. 3). For example to obtain a $\pi/2$ (or $\lambda/4$) phase shift the length of the electrodes should be L=400 $\mu$m. A phase shift in the grating results in a narrow transmission window within the stop band of the grating. Phase shifted Bragg gratings are shown in FIGS. 17a and 17b (for phase shift $\pi/2$ and $2\pi/3$, respectively). The calculated reflectivity is shown for uniform Bragg grating. This method may be applied to obtain tunable phase shifts in other kind of gratings (apodized, non-uniform) which is rather difficult to obtain even in the static regime.

Another possibility to obtain a tunable phase shift is based on cleaving the fiber within FBG, and filling the gap between the two parts of the FBG with controllable refractive index material such as an electro-optic material, thermo-optic material or other.

The embodiments of the invention described above are intended to be exemplary only. The scope of the invention is therefore intended to be limited solely by the scope of the appended claims.

We claim:

1. A method for controlling dispersion of light propagating within an optical waveguide comprising a core surrounded by a cladding having a substantially fixed index of refraction, the method comprising a step of:

controlling a differential group delay of light reflected by a grating within the waveguide by varying a refractive index of a variable-index material surrounding the cladding at least in a control region of the waveguide proximal to the grating and having a cladding thickness which is less than a penetration depth of an evanescent field of light propagating in the grating.

2. A method as claimed in claim 1, wherein the grating is chirped, and wherein the step of controlling the group delay of light reflected by the grating comprises a step of applying a voltage to the variable index material, a magnitude of the voltage being substantially uniform along the length of the grating.

3. A method as claimed in claim 1, wherein the grating is uniform, and wherein the step of controlling the group delay of light reflected by the grating comprises a step of applying a voltage to the variable index material, a magnitude of the voltage defining a voltage gradient along the length of the grating.

4. A method as claimed in claim 1, wherein the variable index material is a birefringent material.

5. An optical device for controlling dispersion of light propagating within an optical waveguide comprising a core surrounded by a cladding having a substantially fixed index of refraction, the optical device comprising:

a control region of the optical waveguide in which a thickness of the cladding is less than a penetration depth of an evanescent field of light propagating in the waveguide core;

a grating within the core of the control region;

a variable-index material surrounding the cladding at least in the vicinity of the grating, the variable-index material having an index of refraction that is controllable in response to an applied stimulus; and a controller adapted to control a differential group delay of light reflected by the grating by controllably applying the stimulus to the variable-index material at least in the vicinity of the grating.

6. An optical device as claimed in claim 5, wherein the grating extends beyond an end of the control region.

7. An optical device as claimed in claim 5, wherein the variable index material is a birefringent material.

8. An optical device as claimed in claim 5, wherein the variable-index material is an electro-optic material responsive to an applied voltage, and wherein the controller comprises:

at least one pair of electrodes in electrical contact with the variable index material and disposed on opposite sides of the waveguide; and a voltage source for applying a selected voltage across the pair of electrodes.

9. An optical device as claimed in claim 8, wherein the grating is chirped, and wherein a single pair of electrodes extend along at least a portion of the grating such that a substantially uniform voltage is applied along the grating.

10. An optical device as claimed in claim 8, wherein the grating is uniform, and wherein there are at least two pairs of electrodes disposed along the length of the grating, each pair of electrodes being connected to the voltage source to receive respective different voltages, so as to produce a voltage gradient along the grating.

* * * * *